June 30, 1942.   M. H. GROVE   2,287,992
VALVE CONSTRUCTION
Filed Oct. 4, 1939
FIG_1_
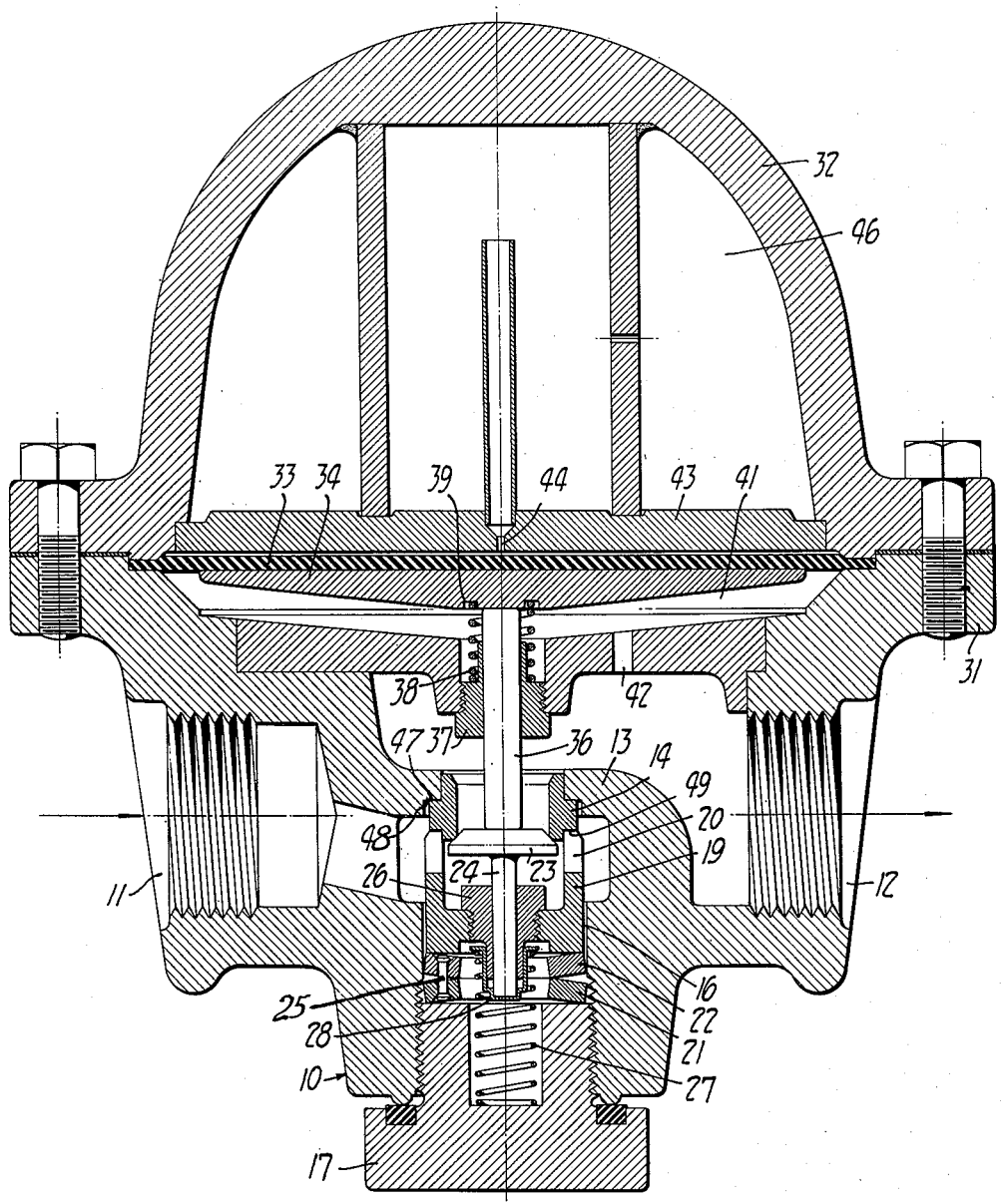
INVENTOR
Marvin H. Grove
BY
ATTORNEY Patented June 30, 1942

2,287,992

UNITED STATES PATENT OFFICE 2,287,992

VALVE CONSTRUCTION

Marvin H. Grove, Berkeley, Calif.

Application October 4, 1939, Serial No. 297,855

3 Claims. (Cl. 50—21)

This invention relates generally to valves for controlling flow of various fluids, particularly valves in which a valve member moves in opposite directions with respect to an annular valve seat.

In connection with valves of the above character it has been common in the past to make use of a seat ring, forming a part of or mounted upon the bridge of the valve body. Where the seat ring is removable from the bridge the valve body has been provided with a side opening into which parts are inserted for attaching or holding the seat ring in place. Such structures have the disadvantage that they require careful machining operations to insure proper alignment of the seat ring with the parts for holding the seat ring in place. In addition such assemblies are commonly used with a valve member, the stem of which is guided in additional parts which must be carefully machined in alignment with the seat ring. Such requirements add materially to cost of manufacture and difficulty of assembly, and in addition such a valve construction is difficult to repair, should it be necessary to replace the seat ring.

It is an object of the present invention to provide a valve structure which will facilitate proper fluid tight engagement of the valve member with respect to its seat, irrespective of the accuracy with which certain parts are machined.

Another object of the invention is to provide a valve structure having a readily renewable seat ring, together with provision for normally holding the ring in sealed engagement with the bridge.

A further object of the invention is to provide a valve structure having a novel sub assembly including a seat ring and the valve for the same, which sub assembly can be readily introduced into a valve body with proper positioning of the seat ring upon the bridge of the body.

Further objects of the invention will appear from the following description in which the preferred embodiment of the invention has been set forth in detail in conjunction with the accompanying drawing.

Referring to the drawing the figure is a side elevational view, in cross-section, illustrating a valve incorporating the present invention, and forming a part of the gas flow regulator.

The valve illustrated in the drawing consists of a body 10 having inflow and outflow passages 11 and 12. Within the body there is a conventional bridge 13, which has an opening to receive the seat ring 14. Extending through one side of the body there is an opening 16 which is generally in alignment with the ring 14. This opening is normally sealed by a closure 17 which is suitably secured to the body as by means of a threaded engagement.

Loosely fitted within the opening 16 there is a sleeve 19, one end of which is provided with ports or slots 20 for passage of fluid. Resilient means is disposed between the inner end of the closure plug 17 and the adjacent end of sleeve 19, for the purpose of normally urging this sleeve in a direction to properly hold the seat ring 14 upon the bridge. This resilient means is preferably formed by a pair of "Belville" washers 21 and 22. By Belville washers, I have reference to washers made of hardened steel or other spring metal and which are normally bent to conform substantially to the surface of a cylinder. It will be noted that the two Belville washers are positioned back to back with such angular relationship as to make possible maximum deflection. They are also shown loosely connected by a pin 25 to insure their proper back to back positioning when placed in valve body.

The valve member 23 cooperates with seat ring 14, and has a guide stem 24 extending towards the closure 17. Sleeve 19 is provided with a bushing 26 within which stem 24 is guided. A compression spring 27 is provided to urge the stem 24 in a direction to normally close the valve member. One end of spring 27 is shown seated upon the closure 17, while the other end is shown seated upon a cup 28, which in turn engages the adjacent end of stem 24.

The valve construction described above may be operated manually by a suitable actuating member or it may be operated by some suitable automatic means. In the present instance it is shown operated automatically by a fluid operated diaphragm to provide a pressure regulator, substantially in accordance with Grove Patent 2,047,101. Thus the body is provided with an annular flange 31 to which the dome 32 is bolted. A flexible diaphragm 33 extends across the face of the dome 32, and has its peripheral edge portion clamped between annular opposed surfaces of the dome and the body. One side of the diaphragm is engaged by the plate 34, which in turn abuts the upper end of an actuating rod 36. A bushing 37 carried by the body serves to guide rod 36, and the lower end of this rod engages the valve member 23. A light compression spring 38 has its lower end seated upon bushing 37, and its upper end seated within an annular groove 39 formed in the plate 34. This pring serves to retain the diaphragm plate 34 in engagement with the diaphragm, and also serves to retain the diaphragm plate generally aligned with respect to the actuating rod 36. The space 41 below the diaphragm communicates through port 42 with the outflow passage 12. Extending across the other side of the diaphragm there is a rigid baffle plate 43, which is mounted upon the dome, and which is provided with a restricted orifice 44. As explained in said Grove Patent 2,047,101, this baffle plate serves to prevent chattering and slapping of the valve member upon its seat, and makes possible smooth action over a wide variety of pressures.

In a complete regulator as described above the chamber 46 in dome 32 contains gas at a pressure corresponding generally to the pressure of gas desired upon the outflow side. The diaphragm 33 then serves to actuate rod 36 and the valve member 23, to automatically regulate flow of gas through the body in order to maintain the outflow pressure desired.

The assembly described above serves to retain the seat ring upon the bridge 13 in such a manner as to maintain sealed engagement with the bridge. In this connection it is desirable to form the seat ring substantially as illustrated, with a flat annular shoulder 47 of the ring opposed to a similar shoulder 48 formed on the bridge 13. These shoulders should be accurately machined and may be separated by a thin gasket in order to insure a proper seal. It is also desirable to provide the seat ring with a flat annular shoulder 49 to form an abutment surface engaging with the upper end of the sleeve 19, as illustrated.

In the manufacture of my valve construction it is not necessary to accurately machine the bore 16 in alignment with the machining operations upon the bridge. The seat ring is accurately machined and sleeve 19 is accurately machined so that when in abutting engagement with the seat ring the guide bushing 26 for the valve stem 24 is properly aligned with the seat. Thus when assembled as illustrated in the drawing proper alignment of the valve member with its seat is determined solely by virtue of engagement of sleeve 19 with the seat ring. Should there be some misalignment of the machining operations upon the bridge 13, with respect to the machining of the bore 16, this does not in any way affect alignment of the valve member with respect to the seat, since such misalignment is accommodated by the clearance about the sleeve 19 and by the Belville washers 21 and 22. These washers apply force to maintain firm abutment between sleeve 19 and the seat ring 14, and to apply sufficient pressure to the seat ring to maintain proper sealed engagement with the bridge. They should be stressed to afford proper thrust against sleeve 19, without being entirely flattened out in such a manner as to be devoid of further give.

My valve can be readily serviced or repaired in the event the valve member or seat ring becomes worn or damaged. It is a simple matter to remove the closure plug 17, and to then remove the Belville washers 21 and 22, the sleeve 19, and then the seat ring 14. One can be certain that a new seat ring will properly seal upon the bridge and that a replaced valve member will properly engage the seat.

I claim:

1. In a valve construction, a valve body having fluid inlet and outlet passages and also having bridge means between said passages, a seat ring fitted upon the bridge means, an opening through one side of the body in general alignment with the seat ring, a closure for the opening removably secured to the body, a sleeve extending from the seat ring and disposed within said opening, there being a clearance between the sleeve and the body whereby alignment of the sleeve is determined by the positioning of the seat ring, resilient means interposed between the closure and the adjacent end of said sleeve, whereby said sleeve is urged by said resilient means to rigidly hold the seat ring upon the bridge, a valve member cooperating with the valve seat, a stem secured to the valve member, said stem terminating short of said closure and being guided solely within the sleeve, and spring means interposed between the valve stem and said closure.

2. In a valve construction, a valve body having fluid inlet and outlet passages and also having bridge means between said passages, a seat ring fitted upon the bridge means, an opening through one side of the body in general alignment with the seat ring, a closure for the opening removably secured to the body, a sleeve extending from the seat ring and disposed within said opening, there being a clearance between the sleeve and the body whereby alignment of the sleeve is determined by the positioning of the seat ring, at least one Belville spring interposed between the closure and the adjacent end of the sleeve, whereby said sleeve is urged by said resilient means to rigidly hold the seat ring upon the bridge, a valve member cooperating with the valve seat, a stem secured to the valve member, said stem terminating short of said closure and being guided solely within the sleeve, and spring means interposed between one end of the valve stem and said closure.

3. In a valve construction, a valve body having fluid inlet and outlet passages and also having a bridge between said passages, the bridge being formed to provide an annular shoulder faced toward the inlet, a stationary seat ring fitted upon the bridge and having rigid abutting engagement with said shoulder, whereby inlet pressure acting upon the ring tends to urge the same against said shoulder, an opening in one side of the body in general alignment with the seat ring, a closure for said opening, the closure being removably secured to the body, a separate sleeve disposed within said opening, one end of the sleeve being seated upon the seat ring, there being a clearance between the sleeve and the body whereby alignment of the sleeve is determined by the positioning of the seat ring, a valve member cooperating with the seat ring and engaging the inlet side of the same, a stem secured to the valve member and slidably guided solely within said sleeve, said sleeve, valve and valve stem being removable as a unit upon removal of said closure, and resilient means interposed between said closure and the adjacent end of said sleeve for normally urging said sleeve in a direction to rigidly hold said seat upon the bridge during operation of the valve member.

MARVIN H. GROVE.